United States Patent [19]

Cohen

[11] Patent Number: 4,845,156
[45] Date of Patent: Jul. 4, 1989

[54] PREPARATION OF MACROMONOMERS

[75] Inventor: Gordon M. Cohen, Wynnewood, Pa.

[73] Assignee: E. I. Du Pont De Nemours and Company, Wilmington, Del.

[21] Appl. No.: 135,398

[22] Filed: Dec. 21, 1987

[51] Int. Cl.$^4$ ............................................. C08F 259/00
[52] U.S. Cl. .................................... 525/259; 525/250; 525/255; 525/258; 525/261; 525/262; 525/267; 525/276; 525/291; 525/310; 528/26
[58] Field of Search ............... 525/276, 254, 267, 310, 525/291, 255, 250, 259, 261, 262, 258; 528/26

[56] References Cited

U.S. PATENT DOCUMENTS

| 3,842,057 | 10/1974 | Milkovich | 525/276 |
|---|---|---|---|
| 4,269,790 | 5/1981 | de Vries | 260/543 |
| 4,414,372 | 11/1983 | Farnham et al. | 526/190 |
| 4,417,034 | 11/1983 | Webster | 526/190 |
| 4,508,804 | 4/1985 | Webster | 526/190 |
| 4,524,196 | 6/1985 | Farnham et al. | 526/190 |
| 4,581,428 | 4/1986 | Farnham et al. | 526/190 |
| 4,588,795 | 5/1986 | Dicker et al. | 526/192 |
| 4,598,161 | 7/1986 | Farnham et al. | 564/101 |
| 4,605,716 | 8/1986 | Hertler | 526/190 |
| 4,622,372 | 11/1986 | Dicker et al. | 526/190 |
| 4,656,233 | 4/1987 | Hertler et al. | 526/190 |
| 4,659,782 | 4/1987 | Spinelli | 525/293 |
| 4,659,783 | 4/1987 | Spinelli | 525/293 |
| 4,681,918 | 7/1987 | Webster | 525/282 |

FOREIGN PATENT DOCUMENTS 2557523 7/1976 Fed. Rep. of Germany.

OTHER PUBLICATIONS

Webster et al., "Group Transfer Polymerization—A New and Versatile Kind of Addition Polymerization", J. Am. Chem. Soc. 105, 5706, (1983).
J. J. Krutak et al., J. Org. Chem., 44, 3847, (1979).
S. A. Rostovtsev et al., Vysokomol. Soedin., Ser. A, 9, 289, (1967).
D. Brandes et al., J. Organomet. Chem., 99(2), C33—5, (1975).
P. Lutz et al., Polymer Bull., 12, 79, (1984).
S. L. Beaucage et al., Tetrahedron Lett., 20, 1691, (1977).
R. A. Olofson and J. Cuomo, Tetrahedron Lett., 21, 819, (1980).
R. Asami et al., Polymer Preprints (ACS), 27, (1) 186, (1986).
B. C. Anderson et al., Macromol., 14, 1599, (1981).

Primary Examiner—John C. Bleutge
Assistant Examiner—Ralph H. Dean, Jr.

[57] ABSTRACT

Macromonomer prepared by contacting and reacting a polymer (oligomer) having at least three monomer repeat units and at least one silyl ether group, in the presence of an anion catalyst, with a terminally unsaturated acyl fluoride or sulfonyl fluoride.

17 Claims, No Drawings

PREPARATION OF MACROMONOMERS

BACKGROUND OF THE INVENTION

1. Field of the Invention

This invention relates to a process for preparing macromonomers from polymers containing silyl ether groups.

2. Background

D. Brandes and A. Blaschette, J. Organomet. Chem., 99 (2), C33-5 (1975) disclose the reaction of trimethylsilyl-t-butyl peroxide with acetyl chloride or fluoride to give the acylated peroxide $CH_3C(O)OOC(CH_3)_3$ and $(CH_3)_3SiX$ wherein X is Cl or F. No reaction with silyl ethers or unsaturated acyl fluorides is suggested, and only low molecular weight compounds are disclosed.

P. Lutz et al., Polymer Bull., 12, 79 (1984) disclose the preparation of polyalkylmethacrylate macromonomers by the reaction of terminal carbanionic sites with electrophilic reagents such as p-vinylbenzyl or p-isopropenylbenzyl bromide, or methacroyl chloride. Methacroyl chloride was found to be non-selective, a sharp increase in molecular weight and carbanion attack on the double bond being observed.

S. L. Beaucage et al., Tetrahedron Lett., 20, 1691 (1977) disclose the acylation of trialkylsilyl ethers with various acyl anhydrides $(R'CO)_2O$, wherein R' may be $CH_3$—, $(CH_3)_3C$—, $C_6H_5$— or $CH_3(CH_2)_{12}$—, in the presence of excess fluoride ion. No unsaturated moieties are included in R'. The use of acid chlorides leads to undesirable side reactions.

R. A. Olofson and J. Cuomo, Tetrahedron Lett., 21, 819 (1980) disclose fluoride ion catalyzed O-acylation of silyl enol ethers with compounds of the type $RXC(O)F$ wherein X is O, NR' or a single bond, R is a cyclic or acyclic aliphatic radical and R' is methyl or, together with R, morpholino. R includes one unsaturated group, $CH_2=C(CH_3)$— when X is O. There is no disclosure of acylation with unsaturated acyl fluorides.

R. Asami et al., Polymer Preprints (ACS), 27 (1), 186 (1986) disclose macromonomers of poly(methyl methacrylate) prepared by Group Transfer Polymerization (GTP) wherein the "living" ends (silyl ketene acetals) are capped with 4-bromomethylstyrene, or wherein the polymerization is initiated with a styryl-functional silyl ketene acetal. Acyl fluorides or silyl ethers are not disclosed.

Macromonomers prepared by polymerizing methyl methacrylate by GTP using a styryl terminated silyl ketene acetal initiator, with the resulting styryl-terminated polymer being reacted with methanol to form the macromonomer, are disclosed in Japanese publication J6 2062-801-A B. C. Anderson et al., Macromol., 4, 1599 (1981) disclose the preparation of macromonomers from anionically polymerized poly(methyl methacrylate) (PMMA) by capping anionic ends with allyl bromide or 4-bromo- or 4-iodomethylstyrene.

Terminally unsaturated acyl fluorides are known or are obvious compounds. The preparation and use of vinyl sulfonyl fluoride or 1-methylvinyl sulfonyl fluoride is disclosed by J. J. Krutak et al., J. Org. Chem., 44, 3847 (1979); U.S. Pat. No. 4,269,790; DE No. 2,557,523; and S. A. Rostovtsev et al., Vysokomol. Soedin., Ser. A, 9, 289 (1967).

The preparation of terminally unsaturated (meth)acrylic polymers or oligomers (macromonomers) by the reaction of silyl ether groups in (meth)acrylic polymers or oligomers with terminally unsaturated acyl fluorides or sulfonyl fluorides has not been disclosed in the art. Selectivity in a Michael-type addition to $\alpha,\beta$-unsaturated acyl/sulfonyl fluorides is also not disclosed in the art.

Silyl ether-functional (meth)acrylic polymers are known. Silyl ether-terminated (meth)acrylic polymers are most conveniently prepared by procedures described in U.S. Pat. Nos. 4,414,372; 4,417,034; 4,508,880; 4,524,196; 4,581,428; 4,588,795; 4,598,161; 4,605,716; 4,622,372; 4,656,233; 4,659,782; 4,659,783; and 4,681,918; and in commonly assigned U.S. patent application Ser. Nos. 660,588 filed Oct. 18, 1984 now U.S. Pat. No. 4,711,942; 912,117 and 912,118 filed Sept. 29, 1986 now U.S. Pat. No. 4,732,955; 934,826 filed Nov. 25, 1986, now U.S. Pat. No. 4,783,500; 004,831 filed Jan. 13, 1987; 007,758 filed Jan. 27, 1987, now U.S. Pat. No. 806,605; and 048,958 filed May 19, 1987. These techniques, in summary, comprise polymerizing an acrylic or maleimide monomer to a "living" polymer in the presence of:

(i) a tetracoordinate organo (Si, Sn or Ge) initiator compound having at least one initiating site including such a compound having at least one oxygen, nitrogen or sulfur atom attached to the Si, Sn or Ge; and (ii) a co-catalyst which is a source of fluoride, bifluoride, cyanide or azide ions or a suitable Lewis acid, Lewis base or selected oxyanion. Such polymerization processes have become known in the art as Group Transfer Polymerization (Webster et al., "Group Transfer Polymerization—A New and Versatile Kind of Addition Polymerization", J. Am. Chem. Soc. 105, 5706 (1983)). The disclosures of the aforesaid patents and patent applications on Group Transfer Polymerization are incorporated herein by reference for purpose of supporting the description of the present invention and are hereinafter referred to as "the foregoing patents and patent applications".

SUMMARY OF THE INVENTION

The invention resides in a process for the preparation of macromonomers by contacting and reacting a polymeric (oligomeric) silyl ether having at least three monomers repeat units and at least one silyl ether group (also referred to as a trialkylsiloxy group) with a terminally unsaturated acyl fluoride or sulfonyl fluoride in the presence of a catalytic quantity of fluoride, bifluoride, cyanide or azide ion, or an oxyanion that is capable of forming a conjugate acid having a pKa (DMSO) of about 5 to about 24, or an alkoxide ion having from 1 to 4 carbon atoms. The aforesaid anions are hereinafter referred to as anion catalysts.

Suitable terminally unsaturated acyl fluorides or sulfonyl fluorides include those of the formula $CH_2=C(Y)RX$ wherein:

X is —C(O)F or —$SO_2F$;

Y is H or $CH_3$; and

R connects C and X and is a single bond; a $C_{1-12}$ hydrocarbylene diradical which is aliphatic, aromatic or mixed aliphatic-aromatic; or said diradical which contains one or more of the following: (i) at least one substituent that is unreactive under macromonomer-forming conditions; (ii) at least one heteroatom, selected from O, N and S, within aliphatic portions thereof.

Preferably R is a single bond or phenylene, Y is methyl and X is —C(O)F. Methacryloyl fluoride is more preferred.

Preferably, the polymeric silyl ether and the macromonomer prepared therefrom are comprised of (meth)acrylic monomer repeat units.

As the terms are used herein, "macromonomer" is a polymerizable compound comprising at least three repeat units of the monomer. "Oligomer" is a non-polymerizable compound comprising at least three repeat units of the monomer, and "polymer" is intended to cover such non-polymerizable materials as well as materials having a greater minimum number of repeat units, for example, at least ten repeat units of the monomer. "Acyl" means the moiety remaining after removal of the hydroxyl group from an organic carboxylic acid.

DETAILED DESCRIPTION OF THE INVENTION

The preferred silyl ethers are polymers having at least ten monomer repeat units, which may contain fluorine and/or intrachain oxygen and/or functional substituents that are unreactive under macromonomer-forming conditions. Such functional substituents are useful in further chemical processing of the macromonomer product or derivatives thereof. Substituents that are unreactive under macromonomer-forming conditions include $-CO_2R^2$, $-OC(O)R^2$, $-NR'R''$, $-C(O)NR'R''$, $-CN$, $-CH=CH_2$, $-P(O)(OR')_2$, $-C(O)R^2$, and $-OH$ and $-CO_2H$ provided these groups are chemically protected, for example, by acetal and ester formation, respectively. In the aforesaid substituents, $R^2$ is a $C_{1-12}$ hydrocarbyl radical which is aliphatic, aromatic or mixed aliphatic-aromatic, and $R'$ and $R''$ are each independently selected from $C_{1-4}$ alkyl. Preferred substituents are $-CO_2R^2$, $-CH=CH_2$, $-NR'R''$, and chemically protected $-OH$ or $-CO_2H$.

Suitable silyl ethers contain groups of the formula $(Q)_2SiO-$ wherein each Q, independently, is selected from $-R^2$, $-OR^2$, $-SR^2$ and $-N(R^2)_2$ and $R^2$ is as defined in the preceding paragraph.

More preferably, the silyl ether is a (meth)acrylic polymer, still more preferably a (meth)acrylic polymer prepared by Group Transfer Polymerization (GTP), as described in the foregoing patents and patent applications, the disclosures of which have been incorporated by reference. Silyl ether groups in suitable polymeric silyl ethers are introduced by use of a silyl ether-functional GTP initiator, or silyl ether-functional monomer containing at least one silyl ether group. Silyl ether-functional GTP initiators contain at least one silyl ether group in addition to at least one terminal silyl ketene acetal (SKA) moiety, the SKA moiety being a GTP initiating site. An example of such as initiator, [(2-methyl-1-[2-(trimethylsiloxy)ethoxy]-1-propenyl)-oxy]trimethylsilane (TTEB), is provided in Example 1. In the GTP polymerization process, the silyl ether group(s) become located at a non-living end of the polymer chain, thus forming a polymeric silyl ether. The "living" polymer prepared by GTP must be quenched either spontaneously or by heating or by chemical reaction of the "living" silyl ketene acetal end group with a stoichiometric amount of an active hydrogen compound, such as an alcohol, acid or water, or an acylating agent, such as an acyl fluoride, aryl ester, carboxylic anhydride, and the like, prior to its use in the present process. Quenching usually is necessary with methacrylate "living" polymers, less so with acrylate "living" polymers, since the "living" end group is less stable in such "living" polymers. The silyl ether group located at the non-living end of the polymer chain remains intact during such treatment (quenching) and thus is available for use in the process of the invention.

The "living" ends must be quenched, either spontaneously or with heat or chemicals, as described above, because they can interfere with conversion to macromonomer. Simply holding at room temperature is sufficient treatment for "living" ends that are unstable at ambient temperatures, such as those of polyacrylates. Chemical quenching agents should be used at a molar ratio of at least 1:1 to the "living" ends present in the polymer.

Although silyl ether-functional (meth)acrylic polymers (oligomers), especially those prepared by GTP, are preferred, other polymeric silyl ethers prepared by other methods known in the art are operable provided the requisite starting material is produced. For example, operable methods based on free radical catalysis or Lewis acid catalysis may be employed. When a silyl ether-functional monomer is employed to prepare a polymeric silyl ether by GTP or other methods, silyl ether groups contained in the polymeric silyl ether can be terminal and/or pendant to the main polymer chain. Groups in either location are reactive in the macromonomer-forming process, although terminal silyl ether groups are preferred.

In carrying out the process of the invention the silyl ether, dissolved in a suitable solvent, is converted to a macromonomer by "capping" with the terminally unsaturated acyl or sulfonyl fluoride at a temperature of about $-80°$ C. to about $200°$ C., preferably about $0°$ C. to about $100°$ C., more preferably in the region of room temperature, in the presence of a catalytic amount of an anion catalyst, or a precursor which provides the anion catalyst during the reaction. Included among these are acetate, m-chlorobenzoate, m-nitrobenzoate and the bianions thereof. The catalyst should be present in a concentration of at least about 1 mol %, preferably at least 2.5 mol %, still more preferably at least 5 mol %, of the silyl ether to obtain a substantial yield of methacrylate end groups. Amounts of anion catalyst significantly in excess of about 40 mol % of the silyl ether are usually undesirable. The counterion of the anion catalyst can be organic or inorganic. Representative are organic counterions, such as tris(dimethylamino)sulfonium (TAS), tetraalkylammonium, and tetraalkylphosphonium, and inorganic counterions, such as ammonium and alkali metals, preferably potassium or sodium. Potassium- or sodium-containing catalysts may be solubilized by use of known phase transfer catalysts or crown ethers. Anion catalysts which have been found to be particularly useful in the process of the invention include fluoride, acetate, m-chlorobenzoate and m-nitrobenzoate.

Suitable solvents for the reaction include aprotic liquids, such as tetrahydrofuran (THF), toluene, benzene and the glymes. If the silyl ether is a liquid, a solvent is not essentially but may still be desirable for heat removal purposes. Total reactant concentration should be at least about 1% (w/v), preferably in the range 5-60% (w/v).

The unsaturated acyl or sulfonyl fluoride should be present, if quantitative reaction is desired, in at least equimolar concentration with the silyl ether, provided that no other silyl ethers are present. For example, if a "living" GTP polymer is quenched with an alcohol, the by-product silyl ether which is produced from the "living" end of the polymer chain can also react with the acyl or sulfonyl fluoride; in such cases, at least a 2:1 molar ratio of fluoride to silyl ether (the moiety which is requisite to the invention) is required. A molar ratio of up to 10:1 is satisfactory.

The products of the process of the invention are macromonomers which possess terminal olefinic unsaturation and which, therefore, can be homo- or copolymerized by conventional methods, such as free radical or ionic polymerization. Preferred macromonomers contain ethenyl or isopropenyl terminal groups, i.e. $CH_2=CH-$ or $CH_2=C(CH_3)-$. The macromonomers may be derived from a wide variety of silyl ethers, as discussed above, the ethers being functionalized as appropriate for their intended use. The macromonomers are particularly useful as building blocks for A/B graft copolymers (i.e. of monomers A and B) which are thermoplastic elastomers; as internally toughened plastics; as compatibilizers for polymer blends; and as rheology control agents in coatings. Macromonomers are especially useful for preparing graft of comb copolymers. Especially preferred macromonomers are those prepared from acrylic polymeric silyl ethers which in turn are prepared by Group Transfer Polymerization.

In the following examples of the invention process, and in the experiments, parts and percentages are by weight and temperatures are in degrees Celsius, unless otherwise specified.

Analyses

Molecular weights are determined by gel permeation chromatography (GPC) using a Waters Associates GPC. Polydispersity (D) is given by the formula $D = \overline{M}_w/\overline{M}_n$; $\overline{M}_w$ and $\overline{M}_n$ are, respectively, weight and number average molecular weights. The high pressure liquid chromatography (HPLC) method of Andrews and Vatvars (Macromol., 14, 1603 [1981]) was used to analyze for PMMA-OH and HO-PMMA-OH in two of the products; PMMA is poly(methyl methacrylate).

$^1$H-NMR spectra were recorded with a Nicolet 360WB spectrometer. The raatio of MMA (methyl methacrylate) units to $C=C$ chain ends was obtained by comparing the peak area of the $CH_3O$ (MMA0 resonance at $\delta$ 3.6 ppm with those of each $C=CH$ resonance at $\delta$ 5.6 and 6.1 ppm. The percentage of chains possessing vinyl ends was determined by comparing MMA/$C=CH$ with the number of MMA units per chain (theoretical or measured by GPC). Where possible, the degree of polymerization was calculated from the ratio of MMA to benzoyl ends obtained by benzoyl fluoride quench, derived by comparing the peak area of $CH_3O$ at $\delta$ 3.6 ppm with Ph at $\delta$ 7.3–7.5 ppm.

Equipment & Reagents

All glassware, including syringes and syringe needles, was dried in a 165° oven overnight prior to use. Rubber septa, "Teflon" parts, and other polymeric materials were dried overnight in a vacuum oven at 65° C., with a slight nitrogen purge. Argon (Air Products) was purified by passage through a reduced Girdler G-33 nickel oxide catalyst trap (United Catalysts, Inc.) for removal of oxygen, and a molecular sieves trap for drying.

Glassware was assembled while hot, flushed with argon with additional external heating, and then maintained at room temperature under a slightly positive pressure of argon.

Methyl methacrylate (MMA) and n-butyl acrylate (BA) (Aldrich Chemical Co.) were dried and freed of alcohol and inhibitor by passing through a column of anhydrous alumina, neutral grade (Woelm), exiting the column through a syringe needle into a serum-capped bottle kept under a slightly positive pressure of argon.

Methacryloyl fluoride (MAF) ws prepared from methacryloyl chloride (MACl) (Aldrich Chemical Co.) and antimony trifluoride (Aldrich Chemical Co.) in accordance with the procedure of U.S. Pat. No. 2,440,090, distilled under nitrogen at 56° C., and inhibited with 200 ppm of phenothiazine. Tetrahydrofuran (THF) was dried over sodium and distilled from sodium benzophenone ketyl immediately before use. Initiators were distilled in a 12-inch spinning band column. Dried solvents, initiators, methacryloyl fluoride, and catalyst solutions were stored in "Aldrich" bottles in drierite-packed desiccators before use. Tetrabutylammonium fluoride (1M in THF), methacryloyl chloride (90%) and anhydrous potassium fluoride (99%) were used as received (Aldrich Chemical Co.). Tetrabutylammonium biacetate was prepared by addition of a stoichiometric amount of acetic acid to a THF solution of tetrabutylammonium acetate (Fluka Chemical Co.), causing the insoluble biacetate to precipitate. The biacetate was dissolved in dry THF only by concomitant addition of 6:1 (mole:mole) water.

EXAMPLE 1

Preparation of PMMA Macromonomer

A. Preparation of Polymeric Silyl Ether by GTP

To a 250-mL, 4-neck r.b. flask, equipped with an argon inlet, thermocouple well, pressure-equalizing dropping funnel, serum cap, and magnetic stirring bar, were introduced (by syringe) dry THF (75 mL), TTEB (2.5 mL, 7.9 mmol), and 0.04M Bu$_4$NOAc.HOAc.6H$_2$O in THF (35 $\mu$L, 0.02 mol % of TTEB; Bu is n-butyl, OAc is acetate). Methyl methacrylate (MMA, 25 mL) was introduced to the stirred solution from the dropping funnel, over a 2-hour period, the flask temperature rising from 26° to a peak of 36° towards the end of the addition. The solution was stirred 4 h and quenched at room temperature with 0.32 mL of methanol (7.9 mmol), introduced by syringe.

This procedure was repeated twice.

B. Preparation of Macromonomer

Into each of the three stirred polymer solutions from about were introduced (by syringe), methacryloyl fluoride (MAF) and 1M Bu$_4$NF/THF (catalyst) as noted below, causing a small exotherm of 0.2° to 0.5°:

|  | MAF, ml (mmol) | Flouride, mL (mol % of TTEB) |
| --- | --- | --- |
| Sample A | 2.8 (31.8) | 0.10 (1.3%) |
| Sample B | 1.4 (15.8) | 0.20 (2.5%) |
| Sample C | 2.8 (31.8) | 0.40 (5.1%) |

The polymer was isolated by precipitation: a concentrated THF solution was poured slowly into a well-stirred beaker of hexane (20-fold excess) containing 0.05 g of phenothiazine inhibitor/500 mL of hexane. The polymer was filtered on a vacuum filter and washed with the phenothiazine-containing hexane, then dried at room temperature. Recovered polymer weights were A: 28.4 g, B: 26.5 g, C: 29.2 g. Polymer molecular weight and $C=C$ content are recorded in Table I below.

C. Proof that Macromonomer C is Free of Residual MAF and Methacrylic Acid

To ensure that some of the vinyl proton resonance in the NMR was not due to residual MAF acylating agent, sample C was purified by reprecipitation. Two g were dissolved in a small amount of THF and poured slowly into a 20-fold excess of well-stirred hexane containing 0.05 g of phenothiazine/500 mL of hexane. The filtered solid was washed with hexane and dried overnight at room temperature in the high vacuum antechamber of a dry box. The MMA/vinyl ratio appears unchanged in the NMR (see Table I, Sample D).

To ensure that some of the vinyl proton resonance in the NMR was not due to methacrylic acid contamination, a possible hydrolysis product of MAF, an organic solution of sample C was extracted with water. Two g were dissolved in 10 mL of ethyl acetate and shaken three times with 10-mL portions of deionized water, the lower aqueous layers being discarded. The polymer was isolated and dried as above by pouring the ethyl acetate layer into a 10- to 20-fold excess of phenothiazine-containing hexane. The MMA/vinyl ratio appears unchanged in the NMR (see Table I, Sampl E).

TABLE I

Theoretical and Measured Molecular Weights and C=C Content of Macromonomers

| Sample | $M_n \times 10^{-3}/$ $M_w \times 10^{-3}$ (GPC) | Theor. $M_n$ $\times 10^{-3}$* | Theor. DP (MMA/TTEB) | MMA Ph (NMR) | MMA C=C (NMR) | % C=C ends, Theor. DP MMA/C=c |
|---|---|---|---|---|---|---|
| A | 3.1/3.7 | 3.2 | 29.4 | — | ** | 0 |
| B | 2.4/2.7 | 3.2 | 29.4 | — | 43 | 69 |
| C | 2.8/3.5 | 3.2 | 29.4 | — | 32 | 91 |
| D | — | 3.2 | 29.4 | — | 31 | 94 |
| E | — | 3.2 | 29.4 | — | 32 | 91 |
| F | 2.8/3.6 | 3.2 | 29.4 | 34 | 29 | 100 |
| G | — | 3.2 | 29.4 | 32 | 33 | 89 |
| H | 8.1/8.4 | 10.4 | 100 | 98 | 104 | 97 |
| I | 2.6/2.9 | 3.2 | 29.4 | 22 | 23 | 100 |
| J | 9.0/10.4 | 10.3 | 100 | 83 | 100 | 100 |

*Assumes 100% MMA conversion to polymer
**No C=CH in NMR: MMA/C=C is infinite
DP = Degree of Polymerization

EXAMPLE 5

Preparation of PMMA Macromonomer

MMA was polymerized as in Example 1, the "living" polymer being quenched 2 h after completing MMA addition with 0.86 mL of benzoyl fluoride (Aldrich Chemical Co., 7.9 mmol) and an additional 0.20 mL of 0.04M Bu₄NOAc.HOAc/THF, causing a 2.6° exotherm. After 30 min, 2.8 mL of MAF (31.8 mmol) and 0.4 mL of 1M Bu₄NF/THF catalyst (5.1 mol % of TTEB) were added to the stirred polymer solution, causing a 0.3° exotherm. Left overnight, the polymer was isolated as in Example 1 and dried at room temperature, first under ambient conditions and then overnight in the high-vacuum antechamber of a dry box. The product (sample F) weighed 31.1 g; its molecular weight and C=C content are recorded in Table I. Five g of the product was further purified by dissolving in THF and reprecipitating in phenothiazine-containing hexane (sample G in Table I).

Three additional macromonomers were prepared by the above method, except that the quantities of reagents used were changed as follows:

TABLE II

| Sample | H | I | J |
|---|---|---|---|
| THF, mL | 225 | 225 | 75 |
| TTEB, mL (mmol) | 2.2 (6.9) | 7.5 (23.6) | 0.74 (2.3) |
| Catalyst$^a$, μL | 26 | 42 | 20 |
| MMA, mL | 75 | 75 | 25 |
| BF, mL (mmol) | 0.75 (6.9) | 2.5 (23.0) | 0.25 (2.3) |
| Catalyst$^a$, mL (mol %*) | 0.20 (0.12) | 0.60 (0.10) | 0.2 (0.36) |
| MAF, mL (mmol) | 2.4 (27) | 8.4 (95) | 0.8 (9.1) |
| Catalyst$^b$, mL (mol %*) | 0.36 (5.2) | 1.2 (5.1) | 0.40 (17.3) |

*Relative to TTEB
$^a$0.04 M Bu₄NOAc.HOAc/THF
$^b$1 M Bu₄NF/THF
BF is Benzoyl Fluoride; MAF is Methacryloyl Fluoride The polymers were isolated by precipitation in 20-fold hexane, vacuum-filtered, and dried on the filter. They were redissolved in methylene chloride and reprecipitated in hexane, vacuum-filtered and dried at room temperature on the filter and then in the fume hood and for 24 h (4 H for sampel J) in a 65° vacuum oven with nitrogen bleed. Recovered from the oven was 74.0 g of H, 70.7 g of I and 29.6 g of J. The molecular weights and C=C contents are recorded in Table I.

EXAMPLE 3

Macromonomer from GTP Poly(Butyl Acrylate) Silyl Ether n-Butyl acrylate (BA) was polymerized as described in Example 1, except that a larger (500 mL) round-bottom flask was used. The flask was charged with THF (225 mL), TTEB (1.7 mL, 5.3 mmol), and 0.01M Bu₄NOAc.HOAc/THF catalyst (10 μL to start), and cooled to 1° in an ice-water bath. BA (75 mL, 0.52 mol) was dripped in over a 70 min period. An additional 40 μL of catalyst was added 8 min after the drip began, to ensure the polymerization of BA, and a 0.5° exotherm was observed 15 minutes later. Another 18 μL of catalyst was added 30 min after the drip began and a larger exotherm was observed within 5 min. The temperature read steadily to 4.9° during the BA feed and decreased when the feed ended.

The ice was removed 2 h after the end of the feed and the product mixture was stirred at room temperature for 4 h and then left unstirred 16 h, to allow the silylketene acetal chain ends to spontaneously terminate. The stirred solution was acylated with methacryloyl fluoride (1.9 mL, 22 mmol) and 1M Bu₄NF/THF (0.43 mL, 8.0 mol % of TTEB). A 0.9° exotherm was observed. The solution was stirred for 8 h and left unstirred for 16 h.

The product solution was concentrated almost to dryness on a rotary evaporator (bath temperature, room temperature to 40°) and the 60 g residue was dissolved in 180 mL of hexane. The solution was extracted 10 times in a separatory funnel with 240 mL portions of 3:1 v/v methanol-water. A total of 0.62 g of residue was recovered from the lower alcoholic layers of the first four extractions. The hexane of the upper layer was removed on the evaporator, leaving 69 g of polymer. Of the sample, 68 g was dissolved in 136 mL of acetone and precipitated in 1020 mL of 1:1 methanol-water. The solvent was decanted from the viscous liquid precipitate. The viscous liquid was rinsed with 340 mL of 1:1 methanol-water, the solvent was "worked" into the polymer and the mixture was allowed to stand for another 30 min. The solvent was then decanted. This rinse was repeated twice. The viscous liquid was allowed to dry overnight at room temperature and was then held 24 h in a 65° vacuum oven with nitrogen bleed. Recovered polymer: 56.0 g. Estimated conversion of BA: 82%.

GPC: $\overline{M}_n$ 15,000, $\overline{M}_w$ 34,000 (excluding a high-MW peak with $\overline{M}_n$ ca. 2,000,000, representing about 7% of the sample) or $\overline{M}_n = 16,000$ and $\overline{M}_w = 285,000$ (including the high-MW peak); theoretical $\overline{M}_n$ 13,000 at 100% BA conversion, 10,500 at 80% BA conversion. Comparison of NMR peaks for C=C at δ 6.1 and 5.6 ppm with CH$_3$ (BA) at 0.9 gave respective BA/C=C ratios of 164 and 134. The theoretical DPs are 98 at 100% BA conversion and 80 at 80%; GPC-calculated DP is 115.

EXAMPLE 4

Additional Catalysts for the Preparation of PMMA Macromonomer

MMA was polymerized as in Example 1, the "living" polymer being quenched 4–4.5 h after completing the MMA addition with 0.32 mL (7.9 mmol) of methanol. After 30 min were added 2.8 mL of MAF (31.8 mmol) and a catalyst whose amount and structure are specified in Table III. After allowing to stand overnight, the polymers were isolated as in Example 1. These samples were designated (as shown in Table IV) T-1 to ZZ-1. Five g of each were further purified by dissolving in THF and reprecipitating in a 20-fold excess of phenothiazine-containing hexane. These were designated (as shown in Table IV) T-2 to ZZ-2. All samples were dried at room temperature, first under ambient conditions and then overnight in the high-vacuum antechamber of a dry box. The product weights are recorded in Table III and the polymer molecular weights and double bond contents in Table IV.

TABLE III

Catalyst Type and Amount; Product Weights

| Sample | Type | Catalyst Molarity (THF) | Volume (mL) | mol % of TTEB | Product Weight (g) |
|---|---|---|---|---|---|
| T | Bu$_4$NF | 1 | 0.1 | 1.3 | 24.3 |
| U | Bu$_4$NF | 1 | 0.4 | 5.1 | 25.2 |
| V | Bu$_4$NOAc | 1 | 0.1 | 1.3 | 24.9 |
| W | Bu$_4$NOAc | 1 | 0.4 | 5.1 | 27.8 |
| X | Bu$_4$N m-chlorobenzoate | 0.38* | 0.27 | 1.3 | 27.0 |
| Y | Bu$_4$N m-chlorobenzoate | 0.38* | 1.0 | 4.8 | 26.3 |
| Z | Bu$_4$N m-nitrobenzoate | 0.039 | 2.6 | 1.3 | 27.0 |
| ZZ | Bu$_4$N m-nitrobenzoate | 0.039 | 10.2 | 5.1 | 25.8 |

*Dried 4.5 h over molecular sieves to reduce water content from 17,000 to 2200 ppm (0.4 mol % of TTEB for X and 1.4 mol % for Y).

TABLE IV

Theoretical and Measured Molecular Weights and C=C Content of Macromonomers

| Sample | $M_n \times 10^{-3}$/ $M_w \times 10^{-3}$ (GPC) | Theor. $M_n$ $\times 10^{-3}$* | Theor. Dp (MMA/TTEB) | MMA C=C (NMR) | % C=C ends, Theor. DP MMA/C=C |
|---|---|---|---|---|---|
| T-1 | 2.5/2.7 | 3.2 | 29.4 | 981 | 3 |
| T-2 | 2.4/2.6 | 3.2 | 29.4 | ** | 0 |
| U-1 | 2.4/2.7 | 3.2 | 29.4 | 31 | 95 |
| U-2 | 2.3/2.7 | 3.2 | 29.4 | 37 | 80 |
| V-1 | 2.5/3.3 | 3.2 | 29.4 | ** | 0 |
| V-2 | 2.4/3.2 | 3.2 | 29.4 | ** | 0 |
| W-1 | 2.6/3.8 | 3.2 | 29.4 | 39 | 76 |
| W-2 | 2.6/3.8 | 3.2 | 29.4 | 44 | 67 |
| X-1 | 2.5/3.1 | 3.2 | 29.4 | 199 | 15 |
| X-2 | 2.5/3.1 | 3.2 | 29.4 | 272 | 11 |
| Y-1 | 2.5/3.2 | 3.2 | 29.4 | 40 | 74 |
| Y-2 | 2.5/3.2 | 3.2 | 29.4 | 41 | 72 |
| Z-1 | 2.5/3.1 | 3.2 | 29.4 | 1590 | 2 |
| Z-2 | 2.4/3.2 | 3.2 | 29.4 | 1580 | 2 |
| ZZ-1 | 2.4/3.2 | 3.2 | 29.4 | 37 | 80 |
| ZZ-2 | 2.4/3.1 | 3.2 | 29.4 | 41 | 72 |

*Assumes 100% MMA conversion to polymer
**No C=CH in NMR: MMA/C=C is infinite
DP = Degree of Polymerization

EXPERIMENT 1 (Control)

Benzoylation of Silyl Ether End Groups in GTP PMMA

To a PMMA silyl ether prepared as in Example 1A were added benzoyl fluoride (3.4 mL, 31 mmol), causing a 0.5° exotherm, and 0.4 mL of 1M Bu$_4$NF/THF (5.1 mol % of TTEB), causing another 3° rise. After standing overnight, the polymer was isolated from the concentrated solution by precipitation into a well-stirred 20-fold volume of hexane, filtered, dried at room temperature, and then dried to constant weight in a 65° vacuum oven under nitrogen (sample K). To ensure removal of residual benzoyl fluoride, a 5-g portion of sample K was dissolved in $CH_2Cl_2$, reprecipitated in hexane, filtered, and dried again, yielding sample L. Samples K and L together weighed 22.7 g. Sample L was further purified by redissolving a portion, reprecipitating, filtering, and drying to obtain sample M. A portion of sample M was further purified by repeating the above procedure to give sample N. Molecular weight and NMR results are summarized in Table V. The purification caused no progressive change in the GPC or in the relevant NMR peaks. However, the persistance of NMR signals at δ 7.55 and 8.0 ppm suggests that traces of benzoyl fluoride or methyl benzoate impurity may still be present.

The extent of conversion of $Me_3SiOCH_2CH_2OC$-(O)C— end groups, derived from TTEB, to $PhC(O)O(CH_2')(CH_2'')OC(O)C$— end groups (abbreviated to Ph in Table III) was determined by NMR. The $CH_2$ moieties are distinguished from one another by the prime superscripts. The degree of polymerization (DP) calculated from NMR-derived MMA/end-groups ratios and from theory are known in Table V. The data indicate that benzoylation of silyl ether end groups is essentially quantitative.

order to convert their silyl ether end groups to OH for HPLC analysis. The analysis showed that no macromonomer had formed and no coupling between "living" ends occured when excess MAF was used; substantial polymer coupling occured, however, when a deficit of MAF was used (MAF/polymer=MAF/TTEB=½). Coupling is presumed to be caused by "living" end reaction with both C═C and C(O)F of MAF. The experiment demonstrates that selective reaction of MAF with nucleophiles is unpredictable, and that selectivity of silyl ether acylation with unsaturated reagents, wherein C═C remains intact, is unexpected.

TABLE VI

| Sample | O | P |
|---|---|---|
| Added MAF, mL (mmol, MAF/TTEB) | 1.39 (15.8, 2) | 0.35 (4.0, ½) |
| Recovered PMMA | 30.7 g | 30.8 g |
| $M_n/M_w$ (GPC) | 2600/3100 | 3000/3900 |
| $M_R$ (theory), uncoupled | 3200 | 3200 |
| NMR: C═C at δ 5.6, 6.1 ppm | NONE | — |
| HPLC: HO-PMMA-OH/PMMA-OH (= coupled/uncoupled PMMA) | 0/100 | 32/68 |

EXPERIMENT 3 (Comparative)

This experiment shows that methacryloyl chloride is ineffective for preparing macromonomers from polymeric silyl ethers.

Three separate MMA polymerizations were conducted by the method of Example 1 and were quenched 2 h later with methanol (method of Example 1) or benzoyl fluoride (method of Example 2), as indicated in Table VII. The polymers were treated with methacryloyl chloride (MACl) and fluoride activators as specified in Table VII. The polymers were isolated as usual by precipitation into hexane containing phenothiazine, filtered, and dried at room temperature in an evacuated dry box antechamber. The recovered weights were repeated in Table VII; GPC and NMR data are given in Table VIII. For two of the samples, 5 g portions were redissolved and reprecipitated. After purification to remove non-polymeric vinyl-containing impurities, none of the polymers contained more than 22% of the theoretical vinyl end-group content. The unpurified sample similarly contained a low level of vinyl ends.

TABLE V

Molecular Weights and Degree of Polymerization (DP) of Benzoyl Fluoride-Capped PMMA

| Sample | $M_n \times 10^{-3}/ M_w \times 10^{-3}$ (GPC) | Theor. $M_n \times 10^{-3}$* | Theor. DP (MMA/TTEB) | Calc. DP, based on: MMA Ph | MMA ($CH_2'$) | MMA ($CH_2''$) |
|---|---|---|---|---|---|---|
| K | 2.3/2.8 | 3.2 | 29.4 | 36 | 34 | 34 |
| L | 2.4/2.8 | 3.2 | 29.4 | 40 | 37 | 38 |
| M | 2.7/3.1 | 3.2 | 29.4 | 42 | 28 | 26 |
| N | 2.8/3.1 | 3.2 | 29.4 | 41 | 28 | 26 |

*Assumes 100% conversion of MMA to polymer

EXPERIMENT 2 (Comparative)

This experiment shows that macromonomers are not produced by acylation of polymeric silyl ethers which retain "living" GTP silyl ketene acetal ends.

Two separate PMMA silyl ether polymers were prepared by the method of Example 1. After 4.5 h, the polymers were treated with MAF (amounts listed in Table VI) and 0.20 mL of 0.04M $Bu_5NOAc.HOAc/THF$. The polymer solutions were stirred for 1 h and left unstirred at room temperature for 17 h. Polymer was isolated by precipitation into a 20-fold volume of well-stirred hexane, filtering, and drying at room temperature. Both samples were analyzed by GPC and one by NMR. Two g of each were treated in THF solution with 0.5 mL of 10% (w/v) HCl/methanol in

TABLE VII

| Reaction of MACl with PMMA Silyl Ether | | | |
|---|---|---|---|
| Sample | Q | R | S |
| Quench methanol, mL (mmol) | 0.32 (7.9) | — | — |
| benzoyl flouride, mL (mmol) | — | 0.86 (7.9) | 0.86 (7.9) |
| 0.04 M $Bu_4NOAc.HOAc/THF$, mL | — | 0.20 | 0.20 |
| Acylation MACl, mL (mmol) | 3.4 (31) | 3.4 (31) | 3.4 (31) |
| 1 M $Bu_4NF/THF$, mL (mmol) | 15.7 (15.7) | 0.4 (0.4) | — |
| anhydrous KF, g (mmol) | — | 0.43 (7.4) | — |
| reflux time (h) | — | — 2 | — |

TABLE VII-continued

| | Reaction of MACl with PMMA Silyl Ether | | |
|---|---|---|---|
| Sample | Q | R | S |
| Recovered PMMA | 32.7 g | 33.0 g | 29.8 g |

TABLE VIII

| | Molecular Weights and C=C Content of MACl Reaction Products | | | | | |
|---|---|---|---|---|---|---|
| Sample | $M_n \times 10^{-3}$/ $M_w \times 10^{-3}$ (GPC) | Theor. $M_n$ $\times 10^{-3}$* | Theor. DP (MMA/TTEB) | MMA Ph (NMR) | MMA C=C (NMR) | % C=C ends, Theor. DP MMA/C=C |
| Q | 3.2/3.9 | 3.2 | 29.4 | — | 52 | 56 |
| Q, purified | 3.1/4.0 | 3.2 | 29.4 | — | 143 | 20 |
| R | 2.9/3.6 | 3.2 | 29.4 | 33 | 115 | 26 |
| R, purified | 2.9/3.7 | 3.2 | 29.4 | 33 | 132 | 22 |
| S | 2.9/3.6 | 3.2 | 29.4 | 34 | 185 | 16 |

*Assumes 100% MMA conversion to polymer

What is claimed is:

1. Process for preparing a macromonomer, the process comprising contacting and reacting a polymeric silyl ether having at least three monomer repeat units and at least one silyl ether group with a terminally unsaturated acyl fluoride or sulfonyl fluoride, in the presence of an anion catalyst consisting of a catalytic quantity of fluoride, bifluoride, cyanide or azide ion, or a catalytic quantity of an oxyanion that is capable of forming a conjugate acid having a pka (DMSO) of about 5 to 24, or a catalytic quantity of an alkoxide ion having from 1 to 4 carbon atoms.

2. Process of claim 1 wherein the terminally unsaturated acyl fluoride or sulfonyl fluoride is of the formula CH$_2$=C(Y)RX, shown structurally as

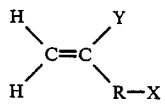

where:

X is —C(O)F or —SO$_2$F;

Y is H or CH$_3$;

R connects C and X and is a single bond; a C$_{1-12}$ hydrocarbylene diradical which is aliphatic, aromatic or mixed aliphatic-aromatic; or said diradical which contains, in addition, one or more of the of the following: (i) at least one substituent, that is unreactive under macomonomer-forming conditions; (ii) at least one heteroatom selected from O, N and S, within aliphatic portions thereof.

3. Process of claim 2 wherein the polymeric silyl ether contains groups of the formula (Q)$_3$SiO— wherein each Q, independently, is selected from the group consisting of —R$^2$, —OR$^2$, —SR$^2$ and —N(R$^2$)$_2$ and R$^2$ is a C$_{1-12}$ hydrocarbyl radical which is aliphatic, aromatic or mixed aliphatic-aromatic.

4. Process of claim 3 wherein Q is R$^2$ and R$^2$ is C$_{1-4}$ alkyl.

5. Process of claim 4 wherein each R$^2$ is methyl.

6. Process of claim 1 wherein the silyl ether contains at least one functional substituent that is unreactive under macromonomer-forming conditions.

7. Process of claim 6 wherein the functional substituent is selected from the group consisting of —CO$_2$R$^2$, —CH=CH$_2$, —NR'R'', and chemically protected —OH or chemically protected —CO$_2$H, wherein R$^2$ is a C$_{1-12}$ hydrocarbyl radical which is aliphatic, aromatic or mixture aliphatic-aromatic, and R' and R'' are each independently selected from C$_{1-4}$ alkyl.

8. Process of claim 1 wherein the polymeric silyl ether and macromonomer product each comprise (meth)acrylic monomer repeat units.

9. Process of claim 8 wherein the polymeric silyl ether is prepared by Group Transfer Polymerization.

10. Process of claim 9 wherein the GTP initiator contains at least one silyl ether group.

11. Process of claim 8 wherein the repeat units comprise silyl ether-functional monomer repeat units.

12. Process of claim 1 wherein the anion catalyst is fluoride, bifluoride, carboxylate or bicarboxylate.

13. Process of claim 12 wherein the anion catalyst is fluoride, acetate, m-chlorobenzoate or m-nitrobenzoate.

14. Process of claim 1 wherein the polymeric silyl ether and macromonomer product contain at least 10 monomer repeat units.

15. Process of claim 1 wherein the polymeric silyl ether is converted to macromonomer by reaction with terminally unsaturated acyl fluoride.

16. Process of claim 15 wherein the reaction temperature is about 0° to about 100° C.

17. Process of claim 16 wherein the anion catalyst concentration is at least about 5 mol % of the silyl ether.

* * * * *

UNITED STATES PATENT AND TRADEMARK OFFICE
CERTIFICATE OF CORRECTION

PATENT NO. : 4,845,156

DATED : July 4, 1989

INVENTOR(S) : Gordon M. Cohen

It is certified that error appears in the above-identified patent and that said Letters Patent is hereby corrected as shown below:

Column 2, line 68, "more" should read --most--.

Column 3, line 36, "$(Q)_2SiO-$" should read --$(Q)_3SiO-$ --.

Column 5, line 19, "of" should read --or--; line 38 "raatio" should read --ratio--; line 40, "(MMAO" should read --(MMA)--.

Column 6, line 1, "ws" should read --was--.

Column 7, line 17, "Sampl" should read --Sample--; Table I, under the heading, both instances "MMA" should read --<u>MMA</u>--; Table I, under the heading, "Theor. DP" should read --<u>Theor. DP</u>--; (third occurrence)

Table II, under the Sample heading, 7th line, "mol%*)" should read --(mol %*) --.

UNITED STATES PATENT AND TRADEMARK OFFICE
CERTIFICATE OF CORRECTION

PATENT NO. : 4,845,156

DATED : July 4, 1989

INVENTOR(S) : Gordon M. Cohen

It is certified that error appears in the above-identified patent and that said Letters Patent is hereby corrected as shown below:

Column 8, line 15, "(4 H for sampel J)" should read --(4 h for sample J)--; line 54, "read" should read --rose--.

Column 10, Table IV, under the heading, "MMA" should read --MMA--; under the heading "Theor. DP" (third occurrence) should read --Theor. DP--.

Column 11, Table V, under the heading, in all three instances, "MMA" should read --MMA--; line 50, "$Bu_5NOAc.-$" should read --$Bu_4NOAc.-$ --.

Column 12, Table VII, under the columns Q, R and S, the first line after Quench should be blank and --0.32(7.9)-- should be inserted on the second line after methanol, mL (mmol); under the column R, in the 4th line reading 0.04 M $Bu_4NOAc.HOAc/THF$, mL, the second "0.20" should be deleted and inserted as --0.20-- in the same line under the column S; under the columns Q, R and S, the 5th line after Acylation should be blank and --3.4(31) 3.4(31) 3.4(31)-- should be inserted on the 6th line after MACl, mL (mmol); under the column R, the 9th line after reflux time (h), the 2 should be deleted and reinserted in the same line under the column S.

UNITED STATES PATENT AND TRADEMARK OFFICE
CERTIFICATE OF CORRECTION

PATENT NO. : 4,845,156

DATED : July 4, 1989

INVENTOR(S) : Gordon M. Cohen

It is certified that error appears in the above-identified patent and that said Letters Patent is hereby corrected as shown below:

Column 13, Table VIII, under the heading, in both instances, "MMA" should read --MMA--; under the heading, "Theor. DP" (third occurrence) should read --Theor. DP--;

Signed and Sealed this

Twelfth Day of February, 1991

*Attest:*

HARRY F. MANBECK, JR.

*Attesting Officer*     Commissioner of Patents and Trademarks